(12) United States Patent
Yamaoka et al.

(10) Patent No.: US 7,005,184 B2
(45) Date of Patent: Feb. 28, 2006

(54) SILICON CARBIDE FIBER HAVING BORON NITRIDE LAYER IN FIBER SURFACE AND PROCESS FOR THE PRODUCTION THEREOF

(75) Inventors: Hiroyuki Yamaoka, Ube (JP); Yoshikatu Harada, Ube (JP); Teruaki Fujii, Ube (JP)

(73) Assignee: UBE Industries, Ltd., Ube (JP)

( * ) Notice: Subject to any disclaimer, the term of this patent is extended or adjusted under 35 U.S.C. 154(b) by 0 days.

(21) Appl. No.: 10/981,525

(22) Filed: Nov. 5, 2004

(65) Prior Publication Data

US 2005/0064189 A1  Mar. 24, 2005

Related U.S. Application Data

(63) Continuation-in-part of application No. 10/751,450, filed on Jan. 6, 2004, now abandoned, which is a continuation-in-part of application No. 10/252,356, filed on Sep. 24, 2002, now abandoned.

(30) Foreign Application Priority Data

Oct. 3, 2001  (JP) ............................. 2001-307112

(51) Int. Cl.
*B32B 9/00* (2006.01)
*B28B 1/00* (2006.01)

(52) U.S. Cl. ................. 428/367; 428/368; 428/375; 428/373; 264/625; 264/627; 264/630; 501/95.1

(58) Field of Classification Search ............... 428/367, 428/368, 375, 373; 264/625, 627, 639; 501/95.1, 501/88
See application file for complete search history.

(56) References Cited

U.S. PATENT DOCUMENTS

| 4,642,271 | A | | 2/1987 | Rice |
| 5,792,416 | A | | 8/1998 | Sacks et al. |
| 6,040,008 | A | | 3/2000 | Sacks |
| 6,069,102 | A | * | 5/2000 | Sacks ..................... 501/95.1 |
| 6,187,705 | B1 | * | 2/2001 | Sacks ..................... 501/95.1 |
| 6,203,904 | B1 | * | 3/2001 | Sacks ..................... 428/368 |
| 2003/0064220 | A1 | | 4/2003 | Yamaoka et al. |

OTHER PUBLICATIONS

Patent Abstracts of Japan vol. 1997, No. 06, Jun. 30, 1997 & JP 09 031756A (Ube Ind Ltd), Feb. 4, 1997.

\* cited by examiner

*Primary Examiner*—J. M. Gray
(74) *Attorney, Agent, or Firm*—Wenderoth, Lind & Ponack, L.L.P.

(57) ABSTRACT

A silicon carbide fiber having a boron nitride layer in a fiber surface and having the following properties of a to c,
 a. the existent ratio of boron slopingly increases towards the surface of the fiber,
 b. the existent ratio of boron in the region of from the fiber surface to a depth of 500 nm is 0.5 to 1.5% by weight,
 c. the existent ratio of boron in a fiber central portion which is a region of a depth of at least 3 μm below the fiber surface is 0 to 0.2% by weight, and a process for the production thereof.

8 Claims, 2 Drawing Sheets

SILICON CARBIDE FIBER HAVING BORON NITRIDE LAYER IN FIBER SURFACE AND PROCESS FOR THE PRODUCTION THEREOF

This application is a continuation-in-part of now abandoned application Ser. No. 10/751,450, filed Jan. 6, 2004 now abandoned, which is a continuation-in-part of now abandoned Ser. No. 10/252,356, filed Sep. 24, 2002.

FIELD OF THE INVENTION

The present invention relates to a silicon carbide fiber having boron nitride having function as an interface for a ceramic-based composite material in a fiber surface, and a process for the production thereof. Specifically, it relates to a silicon carbide fiber which has a slope constitution in which the existent ratio of boron slopingly increases towards the surface of the fiber.

BACKGROUND OF THE INVENTION

Since ceramic-based composite materials obtainable by reinforcing ceramics with inorganic fibers have high toughness and high strength and are excellent in heat resistance, developments thereof are vigorously made. A SiC/SiC composite material obtainable by reinforcing a silicon carbide matrix with a silicon carbide fiber is one of the most promising materials in a high-temperature use.

It is widely known that characteristics of an interface between the fiber and the matrix are very important for controlling the mechanical properties of the SiC/SiC composite material. That is, a difference in the interfacial bonding strength of the fiber and the matrix exerts a great influence on the mechanical strength of the composite material. When the interfacial bonding of the fiber and the matrix is too large, cracks generated in the matrix easily spread into the fiber so that the material shows very brittle breakdown behavior and its strength and toughness become very low. On the other hand, when the interfacial bonding of the fiber and the matrix is appropriate, bridging or pull-out of the fiber occurs at the destruction of the material so that favorable strength and toughness are shown. For controlling the interfacial bonding strength of the fiber and the matrix, generally, an interface layer is formed on a fiber surface.

As an interface material, there are used carbon, boron nitride and the like. Of these interface materials, boron nitride is the most excellent in heat resistance and receives attention.

When boron nitride is used as an interface material for a ceramic-based composite material, it is required to form a boron nitride layer on a reinforcing fiber surface in some way.

Generally, for example, as shown in Ceramic Engineering Science Proceedings 16 (4) (1995), p 405–416, the formation of boron nitride layer is carried out by using boron trichloride or boron trifluoride and ammonia as a raw material gas according to a chemical vapor deposition method (CVD method) However, the CVD method requires a special CVD device and the raw material gas is expensive and dangerous, so that it is a very high-cost process.

Further, for example, as shown in Journal of American Ceramic Society vol. 77 No. 4, p 1,011–1,016, there has been used a method in which a fiber is immersed in a boric acid solution and then the fiber is sintered in an ammonia atmosphere to form a boron nitride layer on a fiber surface. However, in the solution immersion method like above, it is very difficult to form a boron nitride layer having a uniform thickness on the surface of each fiber of a fiber bundle. In most cases, there is caused bridging in which fibers are bonded to each other with boron nitride layers.

Further, M. D. Sacks et al. disclose a method for forming a boron nitride layer on a silicon carbide fiber surface in U.S. Pat. No. 6,040,008 and Ceramic Engineering and Science Proceedings Volume 21, Issue 4(2,000), p 275–281. In this method, a boron compound is added to a high molecular-weight polycarbosilane having a weight average molecular weight of 7,000 to 16,000, the mixture is dry-spun to form a spun fiber, the spun fiber is sintered in argon gas to introduce boron into a silicone carbide fiber homogeneously, and the resultant fiber is again sintered in a nitrogen-containing atmosphere, thereby forming a boron nitride layer on a silicon carbide fiber surface. However, in the case of the above method, it is very difficult to make the boron homogeneously dispersed in the silicon carbide fiber move to the fiber surface by heat treatment. Therefore, for forming a boron nitride layer having a sufficient thickness as an interface layer on the fiber surface, it is indispensable to increase the amount of boron to be introduced into the silicon carbide fiber. However, the oxidation resistance of the fiber becomes worse as the boron amount in the silicon carbide fiber increases. Further, according to the above document, the silicon carbide layer formed by the above method is arranged in a direction perpendicular to a fiber axis direction so that the boron nitride layer having such a structure can not be expected to exert a big effect as an interface layer for a ceramic-based composite material.

SUMMARY OF THE INVENTION

It is an object of the present invention to provide a silicon carbide fiber having a boron nitride layer, which is useful as a reinforcing fiber for a ceramic-based composite material, in a fiber surface and a process for the production thereof.

It is another object of the present invention to provide a silicon carbide fiber having a slope constitution in which boron increases towards a surface layer and a structure in which boron exists in a fiber surface and in a fiber central portion in specific ratios respectively, and a process for the production thereof.

According to the present invention, there is provided a silicon carbide fiber having a boron nitride layer in a fiber surface and having the following properties of a to c, a. the existent ratio of boron slopingly increases towards the surface of the fiber, b. the existent ratio of boron in the region of from the fiber surface to a depth of 500 nm is 0.5 to 1.5% by weight, c. the existent ratio of boron in a fiber central portion which is a region of a depth of at least 3 μm below the fiber surface is 0 to 0.2% by weight.

According to the present invention, there is provided a silicon carbide fiber according to the above, which is formed of a composite phase comprising a silicon carbide phase and a boron nitride phase.

According to the present invention, there is provided a process for the production of a silicon carbide fiber recited above, which process comprises melt-spinning a modified polycarbosilane obtainable by modifying a polycarbosilane having a main chain structure represented by the formula,

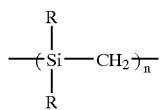

(in which R is a hydrogen atom, a lower alkyl group or a phenyl group) and a number average molecular weight of 200 to 7,000, with an organic boron compound or melt-spinning a mixture of the modified polycarbosilane and an organic boron compound, to obtain a spun fiber;

infusibilizing the spun fiber; and sintering the infusible fiber in a nitrogen-containing atmosphere.

DETAILED DESCRIPTION OF THE INVENTION

Figure 1:
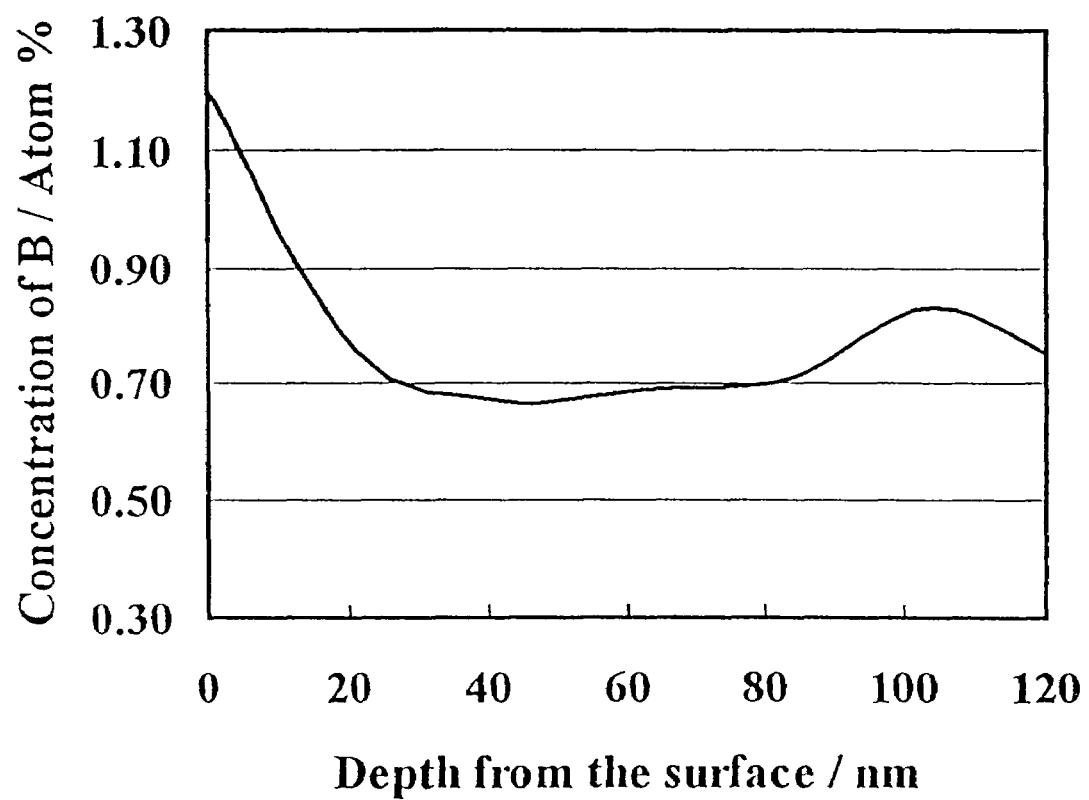
FIG. 1 is a diagram showing the result of analysis of a boron concentration change from the surface of a precursor fiber to the inside thereof by Auger electron spectroscopy in Example 1.

The present invention relates to a silicon carbide fiber which has, in a fiber surface, a boron nitride layer useful as a reinforcing fiber for a ceramic-based composite material and to a process for the production thereof. The silicon carbide fiber of the present invention has a central portion (silicon carbide phase) covering mechanical properties and a boron nitride phase covering interface function in a surface layer and near the surface layer, further has a slope constitution in which boron increases towards the surface layer and has a structure in which boron exists in the fiber surface and in the central portion in specific ratios respectively. Further, it is presumed that the silicon carbide fiber of the present invention has a fiber structure in which the boron nitride layer has a layered structure which is parallel to the fiber surface. Accordingly, there can be obtained a fiber having an interface function excellent in oxidation resistance. In the present invention, dislike the above method of Sack et al., a surface layer having a high boron concentration is formed at a precursor step, as shown in FIG. 1, and it is reacted with a nitrogen-containing substance (e.g., nitrogen or ammonia) which is homogeneously diffused from the fiber surface. It is estimated that a boron nitride layered structure, which is parallel to the fiber surface, is formed as a result.

In the silicon carbide fiber having a boron nitride layer in the fiber surface, the silicon carbide phase may be amorphous or crystalline.

That is, the present invention concerns a silicon carbide fiber formed of a composite phase comprising a silicon carbide layer (first phase) and a boron nitride phase (second phase), which fiber is characterized in that the existent ratio of boron slopingly increases towards the surface layer of the fiber.

The silicon carbide phase (first phase) forms an inside phase of the fiber obtained by the present invention and it plays an important role in covering mechanical properties. The existent ratio of the first phase based on the fiber as a whole is preferably 97% by weight or higher. It is preferred to control the existent ratio of the first phase in the range of from 98 to 99% by weight for exerting the intended functions of the second phase sufficiently and exerting high mechanical properties concurrently.

On the other hand, the boron nitride which constitutes the second phase plays an important role in exerting the intended function in the present invention. It may be amorphous or crystalline. Further, the second phase may include boron carbide. The existent ratio of the second phase which constitutes a surface layer portion of the fiber is preferably 0.5 to 3.5% by weight (boron content 0.2 to 1.5% by weight). It is preferred to control the existent ratio of the second phase in the range of from 0.7 to 2.0% by weight (boron content 0.3 to 0.9% by weight) for exerting its functions sufficiently and exerting high strength concurrently.

The existent ratio of boron in the second phase slopingly increases towards the fiber surface. The thickness of a region where the slope in the constitution is apparently recognized is preferably controlled in the range of 5 to 500 nm. The above "existent ratio" of the second phase refers to a ratio contained in the fiber as a whole. Since the existent ratio of boron in the region of from the fiber surface to a depth of 500 nm is 0.5 to 1.5% by weight and the existent ratio of boron in the central portion which is a region of a depth of at least 3 μm below the fiber surface is 0 to 0.2 or less % by weight, the silicon carbide fiber has an advantage that the fiber maintains excellent oxidation resistance and also shows a function as an interface. When the amount of boron in the fiber surface is smaller than the above range, the function as an interface is insufficient. When the amount of boron in the central portion is larger than the above range, the fiber is insufficient in oxidation resistance.

The process for the production of the silicon carbide fiber having boron nitride in a fiber surface, provided by the present invention, will be explained hereinafter.

In the present invention, mainly, a modified polycarbosilane obtainable by modifying a polycarbosilane which has a main chain structure represented by the formula,

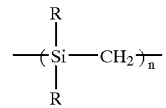

(in which R is a hydrogen atom, a lower alkyl group or a phenyl group) and a number average molecular weight of 200 to 10,000, with an organic boron compound is melt-spun or a mixture of the modified polycarbosilane and an organic boron compound is melt-spun, to obtain a spun fiber; the spun fiber is infusibilized; and then the infusible fiber is sintered in a nitrogen-containing atmosphere, whereby the silicon carbide fiber having boron nitride in a fiber surface can be produced.

The first step of the present invention's process is a step of producing a modified polycarbosilane having a number average molecular weight of 1,000 to 50,000 as a starting material used for producing the silicon carbide fiber having boron nitride in a fiber surface. The fundamental production process of the above modified polycarbosilane is remarkably similar to the production process of JP-A-56-74126. However, in the present invention, it is required to carefully control the bonding state of a functional group described in JP-A-56-74126. The general outlines thereof will be explained hereinafter.

The modified polycarbosilane as a starting material is derived mainly from a polycarbosilane having a main chain structure represented by the formula,

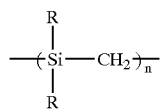

(in which R is a hydrogen atom, a lower alkyl group or a phenyl group) and a number average molecular weight of 200 to 10,000 and an organic boron compound having a basic structure of the formula B(OR')n or the formula BR"m (in which R' is an alkyl group having 1 to 20 carbon atoms or a phenyl group, R" is acetyl acetonate, and each of m and n is an integer of more than 1).

In the present invention, there may be used, as the above polycarbosilane, a polycarbosilane in which at least parts of silicon atoms are bonded to metal elements such as Ti, Zr, Hf, Al, V, Mg or Y directly or through oxygen atoms.

For producing the fiber having a slope constitution, provided by the present invention, it is required to select slow reaction conditions under which only part of the organic boron compound forms a bond with the polycarbosilane. For the above purpose, it is required to carry out the reaction at a temperature of 280° C. or lower, preferably 250° C. or lower, in an inert gas. Under the above reaction conditions, even when the above organic boron compound is reacted with the polycarbosilane, it bonds as a monofunctional polymer (i.e., a pendant-like bonding) and no large increase in molecular weight occurs. The thus-obtained modified polycarbosilane in which the organic boron compound is partially bonded plays an important role in improving the compatibility between the polycarbosilane and the organic boron compound.

When two or more functional groups are bonded, the polycarbosilane forms a cross-linking structure and a noticeable increase in molecular weight is observed. In this case, sudden heat generation and an increase in melt viscosity occur during the reaction. On the other hand, when only one functional group is reacted as described above and an unreacted organic boron compound remains, conversely, a decrease in melt viscosity is observed.

In the present invention, it is preferred to select conditions under which an unreacted organic boron compound is intentionally left. The present invention uses mainly, as a starting material, a material in which the above modified polycarbosilane coexists with an organic boron compound which is in an unreacted state or an organic boron compound which is dimer, trimer or so. However, the modified polycarbosilane alone can be similarly used as a starting material when the modified polycarbosilane contains a modified polycarbosilane component having an extremely low molecular weight.

In the second step of the present invention's process, the modified polycarbosilane obtained in the first step or a mixture of the modified polycarbosilane and a low molecular-weight organic boron compound is molten to form a spinning solution, optionally the spinning solution is filtered to remove substances which are to be detriment at the time of spinning such as a microgel or impurities, and the spinning solution is spun with a generally used synthetic fiber-spinning machine. While the temperature of the spinning solution at the spinning time differs depending upon the softening temperature of the modified polycarbosilane as raw materials, it is advantageous to select a temperature in the range of from 50 to 200° C. The above spinning machine may be equipped with a humidifying and heating cylinder in a nozzle bottom portion as required. The diameter of a fiber is adjusted by changing the amount of ejection from a nozzle and the take-up speed of a high-speed take-up unit attached to a bottom portion of the spinning machine.

In addition to the above-described melt spinning, the second step of the present invention's process can give an intended fiber by dissolving the modified polycarbosilane obtained in the first step or a mixture of the modified polycarbosilane and low molecular-weight organic boron compound in, for example, benzene, toluene, xylene or a solvent which can dissolve the modified polycarbosilane and the low molecular-weight organic boron compound, to form a spinning solution, optionally filtering the spinning solution to remove substances which are to be detriment at the time of spinning such as a macrogel or impurities, and spinning the spinning solution with a generally used synthetic fiber-spinning machine by a dry spinning method while controlling the take-up speed.

In these spinning steps, a spinning cylinder may be attached to the spinning machine as required. An atmosphere in the cylinder is changed to a mix atmosphere mixed with at least one gas selected from the above solvents or replaced with an atmosphere of air, an inert gas, heated air, a heated inert gas, steam, an ammonia gas, a hydrocarbon gas or an organosilicon compound gas, whereby solidification of a fiber in the spinning cylinder can be controlled.

Next, in the third step of the present invention's process, the above spun fiber is preliminarily heated in an oxidizing atmosphere under the action of tension or no tension, to infusibilize the spun fiber. The purpose of this step is to prevent the fiber from melting in the following sintering step and to prevent adjacent fibers from bonding to each other. The temperature for the treatment and the time for the treatment differ depending upon the constitution. Although not specially limited, generally, the treatment is carried out in the range of 50 to 400° C. for several hours to 30 hours. The above oxidizing atmosphere may contain moisture, nitrogen oxide, ozone, etc., which increase the oxidation strength of the spun fiber, and an oxygen partial pressure may be changed intentionally.

In some cases, the softening temperature of the spun fiber becomes less than 50° C. according to the ratio of substances having a low molecular weight contained in the raw materials. In these cases, a treatment for promoting the oxidation of a fiber surface is previously carried out at a temperature lower than the above treatment temperature in some cases. In the third step and the second step, there is advanced bleedout of the low-molecular weight compound, contained in the raw materials, to the fiber surface. It is considered that the ground of the intended slope constitution is accordingly formed.

In the next fourth step of the present invention's process, the above infusible fiber is sintered under tension or no tension at a temperature in the range of 500 to 2,000° C. in a nitrogen-containing atmosphere, to obtain the intended silicon carbide fiber formed of a composite phase comprising a silicon carbide phase (first phase) and a boron nitride phase (second phase), in which the existent ratio of boron slopingly increases towards the surface layer.

Figure 2:
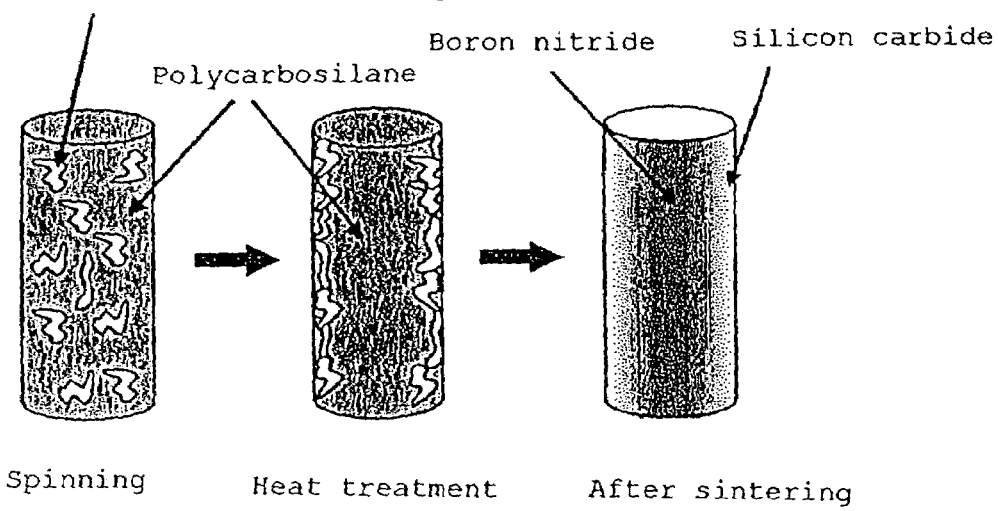
FIG. 2 is an illustration which schematically shows steps of the generation of a silicon carbide fiber having a boron nitride layer in a fiber surface, provided by the present invention.

FIG. 2 schematically shows steps of the generation of the silicon carbide fiber having the intended slope constitution, provided by the present invention.

EXAMPLES

The present invention will be explained with reference to Examples hereinafter.

Referential Example 1

2.5 liters of anhydrous toluene and 400 g of metallic sodium were placed in a three-necked flask having a volume of 5 liters, the mixture was heated to the boiling point of toluene under a flow of nitrogen gas, and 1 liter of dimethyldichlorosilane was dropwise added over 1 hour. After the completion of the addition, the mixture was refluxed under heat for 10 hours to obtain a precipitate. The precipitate was recovered by filtration, and washed with methanol and then with water to give 420 g of a white powder polydimethylsilane.

250 g of the polydimethylsilane was placed in a three-necked flask equipped with a water-cooling refluxing device, and allowed to react under heat at 420° C. for 30 hours under a nitrogen flow, to obtain a polycarbosilane having a number average molecular weight of 1,200.

Example 1

100 g of toluene and 100 g of tributyl borate were added to 100 g of polycarbosilane synthesized according to Referential Example 1, the mixture was preliminarily heated at 100° C. for 1 hour, then the mixture was slowly temperature-increased up to 150° C. to distill the toluene off, the resultant mixture was allowed to react at the above temperature for 5 hours, and then the reaction mixture was further temperature-increased up to 250° C. and allowed to react at this temperature for 5 hours, to obtain a modified polycarbosilane. 10 g of tributyl borate was added to the modified polycarbosilane for the purpose of intentionally making a low-molecular weight organic boron compound coexist, to obtain a mixture of the modified polycarbosilane and the low-molecular weight organic boron compound.

The mixture of the modified polycarbosilane and the low-molecular weight organic boron compound was dissolved in toluene, the resultant solution was placed in a spinning machine made of glass, it was temperature-increased in the spinning machine in which nitrogen had been sufficiently substituted to distill the toluene off and the resultant material was melt-spun at 180° C.

The spun fiber was stepwise heated up to 150° C. in air to form an infusible fiber, and the infusible fiber was sintered in nitrogen at 1,500° C. for 1 hour, to obtain a silicon carbide fiber having a boron nitride layer in a fiber surface.

As a result of TEM observation of the obtained silicon carbide fiber (average diameter: 10 μm), it was confirmed that the boron nitride layer having a layered structure which was parallel to the fiber surface was formed in the fiber surface. The inside silicon carbide phase was amorphous. Further, as a result of elemental analysis, the boron content in the fiber was 0.5% by weight. Further, the fiber was examined for the distribution state of constitutive atoms by Auger. The molar ratio of B/Si was 0.85 in the region of from the outermost surface to a depth of 50 nm, the molar ratio of B/Si was 0.20 in the region of from a depth of 100 nm to 200 nm below the outermost surface, and the molar ratio of B/Si in the central portion was 0. Accordingly, it was confirmed that the fiber had a slope constitution in which boron increased towards the surface. The fiber had a tensile strength of 3.0 GPa. The fiber was heat-treated in air at 1,000° C. for 100 hours and then it was measured for a tensile strength at room temperature. In this case, the fiber after the heat treatment retained at least 90% of the tensile strength shown before the heat treatment. Further, the fiber was molded into a three-dimensional fabric having a fiber ratio of X:Y:Z=1:1:0.1, the fabric was immersed in polytitanocarbosilane (50% xylene solution), the fabric was dried and then the dried fabric was sintered in nitrogen at 1,200° C. for 1 hour. In order to densify the above material, the above immersion-drying-sintering were repeated eight times, to obtain a SiC/SiC composite material. The SiC/SiC composite material was measured for a three-point bending strength at room temperature. The three-point bending strength was 450 MPa. According to fracture observation, it was found that many fibers were pulled out.

Example 2

10 g of aluminum acetylacetonate was added to a toluene solution in which 100 g of polycarbosilane synthesized according to Referential Example 1 was dissolved, and the mixture was allowed to react in a crosslinking reaction at 320° C. under a nitrogen gas flow, to obtain a polyaluminocarbosilane having a number average molecular weight of 2,000.

100 g of toluene and 100 g of tributyl borate were added to 100 g of the obtained polyaluminocarbosilane, the mixture was preliminarily heated at 100° C. for 1 hour, then the mixture was slowly temperature-increased up to 150° C. to distill the toluene off, the resultant mixture was allowed to react at the above temperature for 5 hours, and then the reaction mixture was further temperature-increased up to 250° C. and allowed to react at this temperature for 5 hours, to obtain a modified polycarbosilane. 10 g of tributyl borate was added to the modified polycarbosilane for the purpose of intentionally making a low-molecular weight organic boron compound coexist, to obtain a mixture of the modified polycarbosilane and the low-molecular weight organic boron compound.

The mixture of the modified polycarbosilane and the low-molecular weight organic boron compound was dissolved in toluene, the resultant solution was placed in a spinning machine made of glass, it was temperature-increased in the spinning machine in which nitrogen had been sufficiently substituted to distill the toluene off and the resultant material was melt-spun at 180° C.

The spun fiber was stepwise heated up to 150° C. in air to form an infusible fiber, and the infusible fiber was sintered in nitrogen at 1,900° C. for 1 hour, to obtain a silicon carbide fiber having a boron nitride layer in a fiber surface.

As a result of TEM observation of the obtained silicon carbide fiber (average diameter: 10 μm), it was confirmed that boron nitride layers were formed in the fiber surface. The inside silicon carbide phase was crystalline. Further, as a result of elemental analysis, the boron content in the fiber was 0.5% by weight. Further, the fiber was examined for the distribution state of constitutive atoms by Auger. The molar ratio of B/Si was 0.85 in the region of from the outermost surface to a depth of 50 nm, the molar ratio of B/Si was 0.16 in the region of from a depth of 100 nm to 200 nm below the outermost surface, and the molar ratio of B/Si in the central portion was 0. Accordingly, it was confirmed that the fiber had a slope constitution in which boron increased towards the surface. The fiber had a tensile strength of 2.8 GPa. The fiber was heat-treated in air at 1,000° C. for 100 hours and then it was measured for a tensile strength at room temperature. In this case, the fiber after the heat treatment retained at least 90% of the above strength shown before the heat treatment. Further, the fiber was molded into a three-dimensional fabric having a fiber ratio of X:Y:Z=1:1:0.1, the fabric was immersed in polytitanocarbosilane (50% xylene solution), the fabric was dried and then the dried fabric was sintered in nitrogen at 1,200° C. for 1 hour. In order to densify the above material, the above immersion-drying-sintering were repeated eight times, to obtain a SiC/SiC composite material. The SiC/SiC composite material was measured for a three-point bending strength at room temperature. The three-point bending strength was 400 MPa. According to fracture observation, it was found that many fibers were pulled out.

Comparative Example 1

A silicon carbide fiber having a boron nitride layer in a fiber surface was synthesized according to the method described in U.S. Pat. No. 6,040,008. As a result of TEM observation of the obtained silicon carbide fiber (average diameter: 10 $\mu$m), it was confirmed that boron nitride layers formed in the fiber surface were arranged in a direction perpendicular to a fiber axis direction. The inside silicon carbide phase was crystalline. Further, as a result of elemental analysis, the boron content in the fiber was 2% by weight. Further, the fiber was examined for the distribution state of constitutive atoms by Auger. The molar ratio of B/Si was 0.85 in the region of from the outermost surface to a depth of 50 nm, the molar ratio of B/Si was 0.25 in the region of from a depth of 100 nm to 200 nm below the outermost surface, and the molar ratio of B/Si in the central portion was 0.1. The fiber had a slope constitution in which boron increased towards the surface, while the existence of boron was confirmed even in the inside of the fiber. The fiber had a tensile strength of 2.8 GPa. The fiber was heat-treated in air at 1,000° C. for 100 hours and then it was measured for a tensile strength at room temperature. In this case, the tensile strength of the fiber was decreased to 70% or lower based on the tensile strength shown before the heat treatment. Further, the fiber was molded into a three-dimensional fabric having a fiber ratio of X:Y:Z=1:1:0.1, the fabric was immersed in polytitanocarbosilane (50% xylene solution), the fabric was dried and then the dried fabric was sintered in nitrogen at 1,200° C. for 1 hour. In order to densify the above material, the above immersion-drying-sintering were repeated eight times, to obtain a SiC/SiC composite material. The SiC/SiC composite material was measured for a three-point bending strength at room temperature. The three-point bending strength was 100 MPa, and brittle breakdown behavior was observed. According to fracture observation, it was found that no fiber was pulled out.

Example 3

100 g of toluene and 100 g of tributyl borate were added to 100 g of polycarbosilane synthesized according to Referential Example 1, the mixture was preliminarily heated at 100° C. for 1 hour, then the mixture was slowly temperature-increased up to 150° C. to distill the toluene off, the resultant mixture was allowed to react at the above temperature for 5 hours, and then the reaction mixture was further temperature-increased up to 250° C. and allowed to react at this temperature for 5 hours, to obtain a modified polycarbosilane. 15 g of tributyl borate was added to the modified polycarbosilane for the purpose of intentionally making a low-molecular weight organic metal compound coexist, to obtain a mixture of the modified polycarbosilane and the low-molecular weight organic metal compound.

The mixture of the modified polycarbosilane and the low-molecular weight organic metal compound was dissolved in toluene, the resultant solution was placed in a spinning machine made of glass, it was temperature-increased in the spinning machine in which nitrogen had been sufficiently substituted to distill the toluene off and the resultant material was melt-spun at 180° C.

The spun fiber was stepwise heated up to 150° C. in air to form an infusible fiber, and the infusible fiber was sintered in nitrogen at 1,500° C. for 1 hour, to obtain an inorganic fiber having a boron nitride layer in a fiber surface.

As a result of TEM observation of the obtained inorganic fiber (average diameter: 10 $\mu$m), it was confirmed that a boron nitride layer was formed in the fiber surface. The inside silicon carbide phase was amorphous. Further, as a result of elemental analysis, the boron content in the fiber was 0.5% by weight. Further, the fiber was examined for the distribution state of constitutive atoms by Auger. The existent ratio of boron in the region of from the outermost surface to a depth of 500 nm was 1.2% by weight, and the existent ratio of boron was 0.1% by weight in the region of from a depth of 3 $\mu$m to 5 $\mu$m below the outermost surface. Accordingly, it was confirmed that the fiber had a slope constitution in which boron increased towards the surface. The fiber had a tensile strength of 3.0 GPa. The fiber was heat-treated in air at 1,000° C. for 100 hours and then it was measured for a tensile strength at room temperature. In this case, the fiber after the heat treatment retained at least 90% of the above strength shown before the heat treatment. Further, the fiber was molded into a three-dimensional fabric having a fiber ratio of X:Y:Z=1:1:0.1, the fabric was immersed in polytitanocarbosilane (50% xylene solution), the fabric was dried and then the dried fabric was sintered in nitrogen at 1,200° C. for 1 hour. In order to densify the above material, the above immersion-drying-sintering were repeated eight times, to obtain a SiC/SiC composite material. The SiC/SiC composite material was measured for a three-point bending strength at room temperature. The three-point bending strength was 460 MPa. According to fracture observation, it was found that many fibers were pulled out.

Comparative Example 2

100 g of toluene and 100 g of tributyl borate were added to 100 g of polycarbosilane synthesized according to Referential Example 1, the mixture was preliminarily heated at 100° C. for 1 hour, then the mixture was slowly temperature-increased up to 150° C. to distill the toluene off, the resultant mixture was allowed to react at the above temperature for 5 hours, and then the reaction mixture was further temperature-increased up to 250° C. and allowed to react at this temperature for 5 hours, to obtain a modified polycarbosilane. 3 g of tributyl borate was added to the modified polycarbosilane for the purpose of intentionally making a low-molecular weight organic metal compound coexist, to obtain a mixture of the modified polycarbosilane and the low-molecular weight organic metal compound.

The mixture of the modified polycarbosilane and the low-molecular weight organic metal compound was dissolved in toluene, the resultant solution was placed in a spinning machine made of glass, it was temperature-increased in the spinning machine in which nitrogen had been sufficiently substituted to distill the toluene off and the resultant material was melt-spun at 180° C.

The spun fiber was stepwise heated up to 150° C. in air to form an infusible fiber, and the infusible fiber was sintered in nitrogen at 1,500° C. for 1 hour, to obtain an inorganic fiber having a boron nitride layer in a fiber surface.

As a result of TEM observation of the obtained inorganic fiber (average diameter: 10 μm), it was confirmed that a boron nitride layer was slightly formed in the fiber surface. The inside silicon carbide phase was amorphous. Further, as a result of elemental analysis, the boron content in the fiber was 0.3% by weight. Further, the fiber was examined for the distribution state of constitutive atoms by Auger. The existent ratio of boron in the region of from the outermost surface to a depth of 500 nm was 0.3% by weight, and the existent ratio of boron was 0.1% by weight in the region of from a depth of 3 μm to 5 μm below the outermost surface. Accordingly, it was confirmed that the fiber had a slope constitution in which boron increased towards the surface. The fiber had a tensile strength of 3.0 GPa. The fiber was heat-treated in air at 1,000° C. for 100 hours and then it was measured for a tensile strength at room temperature. In this case, the fiber after the heat treatment retained at least 90% of the above strength shown before the heat treatment. Further, the fiber was molded into a three-dimensional fabric having a fiber ratio of X:Y:Z=1:1:0.1, the fabric was immersed in polytitanocarbosilane (50% xylene solution), the fabric was dried and then the dried fabric was sintered in nitrogen at 1,200° C. for 1 hour. In order to densify the above material, the above immersion-drying-sintering were repeated eight times, to obtain a SiC/SiC composite material. The SiC/SiC composite material was measured for a three-point bending strength at room temperature. The three-point bending strength was 100 Mpa or lower, and brittle breakdown behavior was observed. According to fracture observation, it was found that almost no fiber was pulled out.

Comparative Example 3

100 g of toluene and 100 g of tributyl borate were added to 100 g of polycarbosilane synthesized according to Referential Example 1, the mixture was preliminarily heated at 100° C. for 1 hour, then the mixture was slowly temperature-increased up to 150° C. to distill the toluene off, the resultant mixture was allowed to react at the above temperature for 5 hours, and then the reaction mixture was further temperature-increased up to 250° C. and allowed to react at this temperature for 5 hours, to obtain a modified polycarbosilane. 50 g of tributyl borate was added to the modified polycarbosilane for the purpose of intentionally making a low-molecular weight organic metal compound coexist, to obtain a mixture of the modified polycarbosilane and the low-molecular weight organic metal compound.

The mixture of the modified polycarbosilane and the low-molecular weight organic metal compound was dissolved in toluene, the resultant solution was placed in a spinning machine made of glass, it was temperature-increased in the spinning machine in which nitrogen had been sufficiently substituted to distill the toluene off and the resultant material was melt-spun at 160° C.

The spun fiber was stepwise heated up to 150° C. in air to form an infusible fiber, and the infusible fiber was sintered in nitrogen at 1,500° C. for 1 hour, to obtain an inorganic fiber having a boron nitride layer in a fiber surface.

As a result of TEM observation of the obtained inorganic fiber (average diameter: 10 μm), it was confirmed that a boron nitride layer was formed in the fiber surface. The inside silicon carbide phase was amorphous. Further, as a result of elemental analysis, the boron content in the fiber was 0.8% by weight. Further, the fiber was examined for the distribution state of constitutive atoms by Auger. The existent ratio of boron in the region of from the outermost surface to a depth of 500 nm was 1.5% by weight, and the existent ratio of boron was 0.6% by weight in the region of from a depth of 3 μm to 5 μm below the outermost surface. Accordingly, it was confirmed that the fiber had a slope constitution in which boron increased towards the surface. The fiber had a tensile strength of 3.0 GPa. The fiber was heat-treated in air at 1,000° C. for 100 hours and then it was measured for a tensile strength at room temperature. In this case, the tensile strength of the fiber was decreased to 70% or lower based on the tensile strength shown before the heat treatment. Further, the fiber was molded into a three-dimensional fabric having a fiber ratio of X:Y:Z= 1:1:0.1, the fabric was immersed in polytitanocarbosilane (50% xylene solution), the fabric was dried and then the dried fabric was sintered in nitrogen at 1,200° C. for 1 hour. In order to densify the above material, the above immersion-drying-sintering were repeated eight times, to obtain a SiC/SiC composite material. The SiC/SiC composite material was measured for a three-point bending strength at room temperature. The three-point bending strength was 420 MPa. According to fracture observation, it was found that many fibers were pulled out.

What is claimed is:

1. A silicon carbide fiber having a boron nitride layer in a fiber surface and having the following properties of a. to c.,
   a. the existent ratio of boron slopingly increases towards the surface of the fiber,
   b. the existent ratio of boron in the region of from the fiber surface to a depth of 500 nm is 0.5 to 1.5% by weight based on the fiber as a whole,
   c. the existent ratio of boron in a fiber central portion which is a region of a depth of at least 3 μm below the fiber surface is 0 to 0.2% by weight based on the fiber as a whole.

2. A silicon carbide fiber according to claim 1, wherein the existent ratio of boron is 0.2 to 1.5% by weight based on the fiber as a whole.

3. A silicon carbide fiber according to claim 1, which is formed of a composite phase comprising a silicon carbide phase and a boron nitride phase.

4. A silicon carbide fiber according to claim 3, wherein the amount of the silicon carbide phase is 97% by weight or more based on the fiber as a whole.

5. A silicon carbide fiber according to claim 1, wherein a layer in which the existent ratio of the boron based on the fiber as a whole slopingly increases exists in the range of from 5 to 500 nm below the surface of the fiber.

6. A process for the production of a silicon carbide fiber recited in claim 1, which process comprises
   melt-spinning a modified polycarbosilane obtainable by modifying a polycarbosilane having a main chain structure represented by the formula,

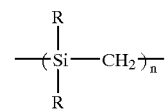

(in which R is a hydrogen atom, a lower alkyl group or a phenyl group) and a number average molecular weight of 200 to 7,000, with an organic boron compound or melt-spinning a mixture of the modified polycarbosilane and an organic boron compound, to obtain a spun fiber;

wherein the organic boron compound is a compound having a basic structure of the formula $B(OR')_n$ or the formula $BR''_m$, in which R' is an alkyl group having 1 to 20 carbon atoms or a phenyl group. R" is acetyl acetonate, and each of m and n is an integer of more than 1;

infusibilizing the spun fiber; and sintering the infusible fiber in a nitrogen-containing atmosphere.

7. A process according to claim 6, wherein at least part of silicon atoms of the polycarbosilane bond to metal atoms selected from the group consisting of Ti, Zr, Hf, Al, V, Mg and Y directly or through oxygen atoms.

8. A process according to claim 6, wherein the organic boron compound bonds to the polycarbosilane as a monofunctional polymer.

* * * * *